US011966173B2

(12) United States Patent
Watanabe

(10) Patent No.: US 11,966,173 B2
(45) Date of Patent: Apr. 23, 2024

(54) IMAGE FORMING APPARATUS

(71) Applicant: TOSHIBA TEC KABUSHIKI KAISHA, Tokyo (JP)

(72) Inventor: Takeshi Watanabe, Yokohama Kanagawa (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 50 days.

(21) Appl. No.: 17/941,170

(22) Filed: Sep. 9, 2022

(65) Prior Publication Data

US 2024/0085819 A1 Mar. 14, 2024

(51) Int. Cl.
*G03G 15/043* (2006.01)

(52) U.S. Cl.
CPC .................................. *G03G 15/043* (2013.01)

(58) Field of Classification Search
CPC .................................................... G03G 15/043
See application file for complete search history.

(56) References Cited

U.S. PATENT DOCUMENTS 11,048,187 B1 * 6/2021 Arai ................. G03G 15/04045
2013/0208068 A1 * 8/2013 Furuta .................... G03G 13/04 347/118
2014/0255053 A1 * 9/2014 Ohshika ............. G03G 15/6585 399/53
2015/0202887 A1 7/2015 Imai
2018/0356759 A1 * 12/2018 Narita .................. G03G 15/043
2022/0269191 A1 * 8/2022 Nakamura ........... G03G 15/043

FOREIGN PATENT DOCUMENTS

JP 2001-270146 10/2001
JP 2009-51152 3/2009
JP 2013-154542 8/2013

* cited by examiner

*Primary Examiner* — Carla J Therrien
(74) *Attorney, Agent, or Firm* — Amin, Turocy & Watson, LLP

(57) ABSTRACT

An image forming apparatus equipped with an exposure device including a plurality of light emitting points, includes a photoconductor and a processor. The processor controls the light emission of each of the plurality of light emitting points of the exposure device based on the image to be formed. The processor calculates a fourth correction coefficient by changing a third correction coefficient, which is calculated based on a first correction coefficient for correcting a first physical quantity related to the exposure condition of the photoconductor by the light emitting point, and a second correction coefficient for correcting a second physical quantity related to the exposure condition of the photoconductor by the light emitting point, based on the light emission time set according to the gradation of the image to be formed, and corrects the light output of each of the plurality of light emitting points by the fourth correction coefficient.

20 Claims, 9 Drawing Sheets

FIG. 5

44

| LIGHT EMISSION POINT No. | 1 | 2 | 3 | 4 | 5 | 6 | 7 | ··· |
|---|---|---|---|---|---|---|---|---|
| FIRST CORRECTION COEFFICIENT | 100 | 114 | 105 | 96 | 104 | 98 | 110 | ··· |
| SECOND CORRECTION COEFFICIENT | 110 | 100 | 93 | 104 | 100 | 90 | 113 | ··· |

FIG. 6

29

| UNIT | LIGHT EMISSION POINT No. | 1 | 2 | 3 | 4 | 5 | 6 | 7 | ··· |
|---|---|---|---|---|---|---|---|---|---|
| K | FIRST CORRECTION COEFFICIENT | 100 | 114 | 105 | 96 | 104 | 98 | 110 | ··· |
| | SECOND CORRECTION COEFFICIENT | 110 | 100 | 93 | 104 | 100 | 90 | 113 | ··· |
| | FOURTH CORRECTION COEFFICIENT (Duty ≥ 50%) | 107 | 109 | 99 | 101 | 101 | 92 | 112 | ··· |
| | FOURTH CORRECTION COEFFICIENT (25% ≤ Duty < 50%) | 104 | 111 | 102 | 99 | 103 | 95 | 111 | ··· |
| | FOURTH CORRECTION COEFFICIENT (0% ≤ Duty < 25%) | 102 | 112 | 104 | 97 | 103 | 97 | 110 | ··· |
| C ⋮ | ⋮ | ⋮ | ⋮ | ⋮ | ⋮ | ⋮ | ⋮ | ⋮ | ⋮ |

| LIGHT EMISSION POINT No. | 1 | 2 | 3 | 4 | 5 | 6 | 7 | ··· |
|---|---|---|---|---|---|---|---|---|
| LIGHT AMOUNT WITHOUT CORRECTION | 100 | 83 | 95 | 104 | 96 | 102 | 91 | ··· |
| FIRST CORRECTION COEFFICIENT | 100 | 114 | 105 | 96 | 104 | 98 | 110 | ··· |
| OUTPUT AFTER FIRST CORRECTION | 100 | 100 | 100 | 100 | 100 | 100 | 100 | ··· |
| SECOND CORRECTION COEFFICIENT | 110 | 100 | 93 | 104 | 100 | 90 | 113 | ··· |
| OUTPUT AFTER SECOND CORRECTION | 110 | 88 | 88 | 108 | 96 | 92 | 103 | ··· |

| LIGHT EMISSION POINT No. | 1 | 2 | 3 | 4 | 5 | 6 | 7 | ... |
|---|---|---|---|---|---|---|---|---|
| LIGHT AMOUNT WITHOUT CORRECTION | 100 | 83 | 95 | 104 | 96 | 102 | 91 | ... |
| FIRST CORRECTION COEFFICIENT | 100 | 114 | 105 | 96 | 104 | 98 | 110 | ... |
| OUTPUT AFTER FIRST CORRECTION | 100 | 100 | 100 | 100 | 100 | 100 | 100 | ... |
| SECOND CORRECTION COEFFICIENT | 110 | 100 | 93 | 104 | 100 | 90 | 113 | ... |
| OUTPUT AFTER SECOND CORRECTION | 110 | 88 | 88 | 108 | 96 | 92 | 103 | ... |
| THIRD CORRECTION COEFFICIENT | 107 | 104 | 97 | 101 | 101 | 92 | 112 | ... |

IMAGE FORMING APPARATUS

FIELD

Embodiments described herein relate generally to an image forming apparatus.

BACKGROUND

An image forming apparatus placed in the workplace forms an image on paper. In a general image forming apparatus, a latent image is formed on a photoconductor by irradiating the photoconductor with image light from an exposure device. The image forming apparatus obtains a visible image by visualizing this latent image with a visualization material (developer). The image forming apparatus transfers this visible image onto the paper. Alternatively, the image forming apparatus once transfers the visible image to an intermediate transfer belt and again transfers the visible image transferred to the intermediate transfer belt onto the paper. Then, the image forming apparatus fixes the visible image transferred onto the paper to the paper by a fixing device.

The image forming apparatus includes a copying machine, a printer device, and a multi-function peripheral (hereinafter, abbreviated as MFP) having both functions.

Various types of exposure devices that irradiate the photoconductor with image light are known. For example, there is an exposure device that uses a solid-state head such as a liquid emitting diode (LED) or an organic light emitting diode (OLED). The solid-state head includes a predetermined number of solid-state light emitting elements such as LED elements, OLED elements, and the like arranged linearly as a plurality of light emitting points. The solid-state head is arranged so that the predetermined number of solid-state light emitting elements extend in the main scanning direction orthogonal to the sub-scanning direction, which is the paper conveying direction. With such an arrangement, a linear image is formed in the main scanning direction on the paper. After that, the paper is conveyed in the sub-scanning direction by an interval determined according to the resolution. By repeating the image formation in the main scanning direction and the paper conveyance in the sub-scanning direction, linear images extending in the main scanning direction are sequentially formed on the paper. In this way, the image forming apparatus using the solid-state head forms an output image determined by the number of pixels in the main scanning direction (the number of elements of the solid-state light emitting element) and the number of images in the sub-scanning direction.

The light amount of the solid-state light emitting element is different for each element. Therefore, in a solid-state head, it is common to keep the light amount between each light emitting point constant by adjusting the light emission time of each element. However, if the light amount is kept constant, vertical streaks will occur in the halftone image due to the influence of variations in the beam diameter caused by the tilt of the lens and the like.

Therefore, it is often the case that the spot diameter is corrected to align the actual spot diameter based on the beam diameter at a specific beam height, and the light amount is not constant. However, the appropriate conditions for this spot diameter correction vary depending on the state of the device and the like. Therefore, a correction method is being considered in which two types of data (constant light amount correction value and spot diameter correction value) are stored in the solid-state head, and on the image forming apparatus side, a third correction value between the two types of correction data is calculated for each light emitting point based on the two types of information and used as the actual correction value.

This correction method has a great effect since the contribution of two types of correction values to the temperature fluctuation on the image forming apparatus side and the focal variation in the main scanning direction is set for each light emitting point or each block, and thus, an appropriate correction is always kept. However, in the first place, the unevenness of the halftone streaks due to the variation of the beam profile largely depends on the method of generating the image including the screen. Generally, white spots appear in low gradation (low density) and color streaks occur in high gradation (high density). That is, even at the same light emitting point, the correction direction is often opposite depending on the gradation, and the above correction method cannot cope with this.

DESCRIPTION OF THE DRAWINGS

FIG. 5 is a diagram showing an example of first and second correction coefficients to be stored in a correction coefficient memory of the exposure device;

FIG. 6 is a diagram showing an example of a correction coefficient table configured in a main memory of the image forming apparatus;

DETAILED DESCRIPTION

In general, according to one embodiment, there is provided an image forming apparatus equipped with an exposure device including a plurality of light emitting points, and the image forming apparatus includes a photoconductor and a processor. The photoconductor forms a latent image of an image to be formed on the surface thereof by the light emitted from the plurality of light emitting points of the exposure device. The processor controls the light emission of each of the plurality of light emitting points of the exposure device based on the image to be formed. The processor calculates a fourth correction coefficient by changing a third correction coefficient, which is calculated based on a first correction coefficient for correcting a first physical quantity related to the exposure condition of the photoconductor by the light emitting point, and a second correction coefficient for correcting a second physical quantity related to the exposure condition of the photoconductor by the light emitting point, and is between the first correction coefficient and the second correction coefficient, based on the light emission time set according to the gradation of the image to be formed, and corrects the light output of each of the plurality of light emitting points by the fourth correction coefficient.

Hereinafter, the image forming apparatus according to the embodiment will be described with reference to the drawings.

Figure 1:
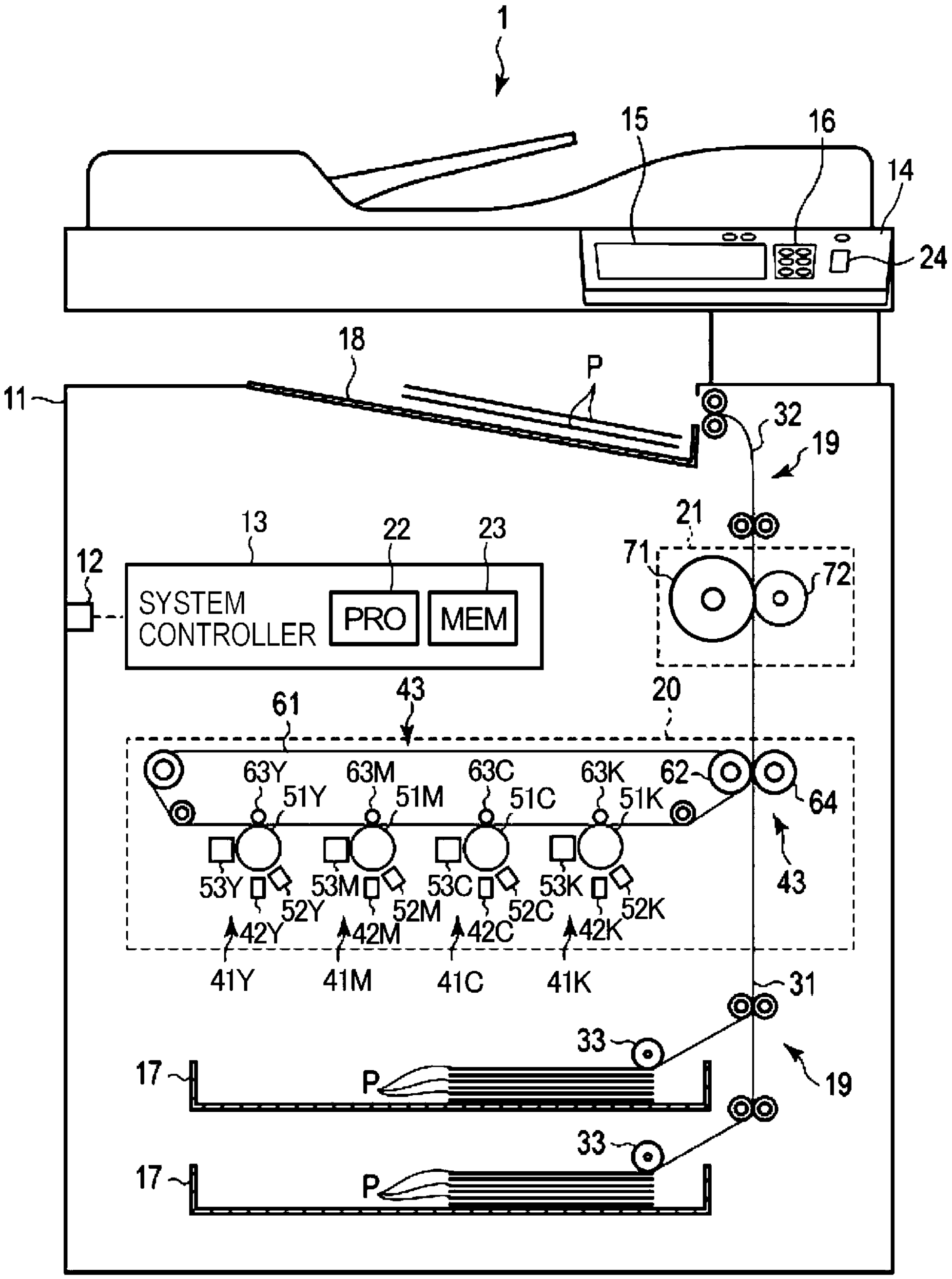
FIG. 1 is a diagram for illustrating an example of a configuration of an image forming apparatus according to an embodiment.

FIG. 1 is a diagram for illustrating an example of a configuration of an image forming apparatus 1 according to the embodiment placed in the workplace. The image forming apparatus is, for example, an MFP that performs various processes such as image forming while conveying a recording medium such as paper. Alternatively, the image forming apparatus is, for example, a solid-state scanning printer (for example, an LED printer) that scans an LED array that performs various processes such as image forming while conveying a recording medium such as paper. For example, the image forming apparatus has a configuration in which toner is received from a toner cartridge and an image is formed on paper by the received toner. The image forming apparatus may be a monochromatic image forming apparatus using black toner, or may be a color image forming apparatus using a plurality of color toners such as cyan (C), magenta (M), yellow (Y), and black (K). The toner may be a decolorable toner that decolorizes if heat is applied. It is assumed that the image forming apparatus 1 according to the present embodiment is a color MFP using a plurality of color toners.

As shown in FIG. 1, the image forming apparatus 1 includes a housing 11, a communication interface 12, a system controller 13, an operation panel 14, a display unit 15, an operation interface 16, a plurality of paper trays 17, a paper discharge tray 18, a conveying unit 19, an image forming unit 20, a fixing device 21, and a main power switch 24.

The housing 11 is the main body of the image forming apparatus 1. The housing 11 accommodates the communication interface 12, the system controller 13, the operation panel 14, the display unit 15, the operation interface 16, the plurality of paper trays 17, the paper discharge tray 18, the conveying unit 19, the image forming unit 20, the fixing device 21, and the main power switch 24.

First, the configuration of the mechanical system of the image forming apparatus 1 will be described.

Each of the plurality of paper trays 17 is a cassette for accommodating the paper P. The paper tray 17 is configured to be able to supply the paper P from the outside of the housing 11. For example, the paper tray 17 is configured to be retractable from the housing 11.

The paper discharge tray 18 is a tray that supports the paper P discharged from the image forming apparatus 1.

Next, a configuration for conveying the paper P of the image forming apparatus 1 will be described.

The conveying unit 19 is a mechanism for conveying the paper P in the image forming apparatus 1. As shown in FIG. 1, the conveying unit 19 includes a plurality of conveyance paths. For example, the conveying unit 19 includes a paper feed conveyance path 31 and a paper discharge conveyance path 32.

The paper feed conveyance path 31 and the paper discharge conveyance path 32 are composed of a plurality of rollers and a plurality of guides. The plurality of rollers rotate under the control of the system controller 13. The plurality of rollers move the paper P by rotating. The plurality of guides control the conveying direction of the paper P.

The paper feed conveyance path 31 picks up the paper P from the paper tray 17 and supplies the picked-up paper P to the image forming unit 20. The paper feed conveyance path 31 includes a pickup roller 33 corresponding to each paper tray. Each pickup roller 33 picks up the paper P of the paper tray 17 into the paper feed conveyance path 31.

The paper discharge conveyance path 32 is a conveyance path for discharging the paper P on which the image is formed from the housing 11. The paper P discharged by the paper discharge conveyance path 32 is supported by the paper discharge tray 18.

Next, the image forming unit 20 will be described.

The image forming unit 20 is a component unit that forms an image on the paper P. Specifically, the image forming unit 20 forms an image on the paper P based on the print job generated by the system controller 13.

The image forming unit 20 includes a plurality of process units 41C, 41M, 41Y, and 41K, a plurality of exposure devices 42C, 42M, 42Y, and 42K, and a transfer mechanism 43. The image forming unit 20 includes an exposure device for each process unit. The plurality of process units 41C, 41M, 41Y, and 41K and the plurality of exposure devices 42C, 42M, 42Y, and 42K each have the same configuration. Therefore, one process unit 41K and one exposure device 42K will be described below.

First, the process unit 41K will be described.

The process unit 41K is a component unit that forms a toner image. For example, the plurality of process units 41C, 41M, 41Y, and 41K are provided for each type of toner. For example, the plurality of process units 41C, 41M, 41Y, and 41K correspond to cyan, magenta, yellow, and black color toners, respectively. Specifically, toner cartridges having toners of different colors are connected to each process unit.

The toner cartridge includes a toner storage container and a toner delivery mechanism. The toner storage container is a container that stores toner. The toner delivery mechanism is a mechanism composed of a screw or the like that sends out toner in the toner storage container.

The process unit 41K includes a photoconductor drum 51K, a charging charger 52K, and a developing device 53K.

The photoconductor drum 51K is a photoconductor including a cylindrical drum and a photoconductive layer formed on the outer peripheral surface of the drum. The photoconductor drum 51K rotates at a constant speed.

The charging charger 52K uniformly charges the surface of the photoconductor drum 51K. For example, the charging charger 52K charges the photoconductor drum 51K to a uniform negative potential (contrast potential) by applying a voltage (development bias voltage) to the photoconductor drum 51K using a charging roller. The charging roller is rotated by the rotation of the photoconductor drum 51K in a state where a predetermined pressure is applied to the photoconductor drum 51K.

The developing device 53K is a device for adhering toner to the photoconductor drum 51K. The developing device 53K includes a developer container, a stirring mechanism, a developing roller, a doctor blade, an auto toner control (ATC) sensor, and the like.

The developer container is a container that receives and stores the toner delivered from the toner cartridge. A carrier is accommodated in the developer container in advance. The toner delivered from the toner cartridge is agitated with the carrier by the stirring mechanism. By this agitation, the toner and the carrier are mixed to form a developer. The carrier is accommodated in a developer container during the manufacture of the developing device 53K.

The developing roller adheres the developer to the surface thereof by rotating in the developer container. The doctor blade is a member arranged at a predetermined distance from the surface of the developing roller. The doctor blade removes a part of the developer adhering to the surface of the rotating developing roller. As a result, a layer of a developer having a thickness corresponding to the distance between the doctor blade and the surface of the developing roller is formed on the surface of the developing roller.

The ATC sensor is, for example, a magnetic flux sensor having a coil and detecting a voltage value generated in the coil. The detected voltage of the ATC sensor changes depending on the density of the magnetic flux from the toner in the developer container. That is, the system controller 13 determines the concentration ratio (toner concentration ratio) of the toner remaining in the developer container to the carrier based on the detected voltage of the ATC sensor. The system controller 13 drives a toner cartridge delivery mechanism based on the toner concentration ratio to deliver toner from the toner cartridge to the developer container of the developing device 53K.

Figure 2:
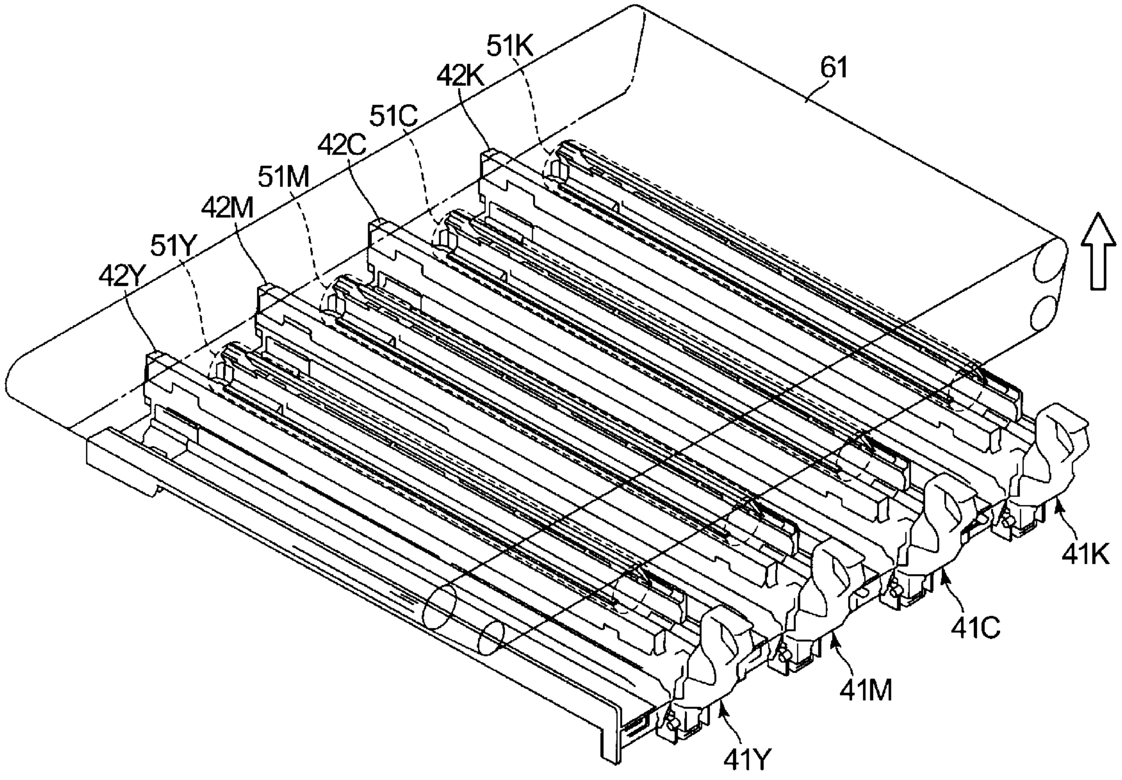
FIG. 2 is a perspective view of an image forming unit included in the image forming apparatus.
Figure 3:
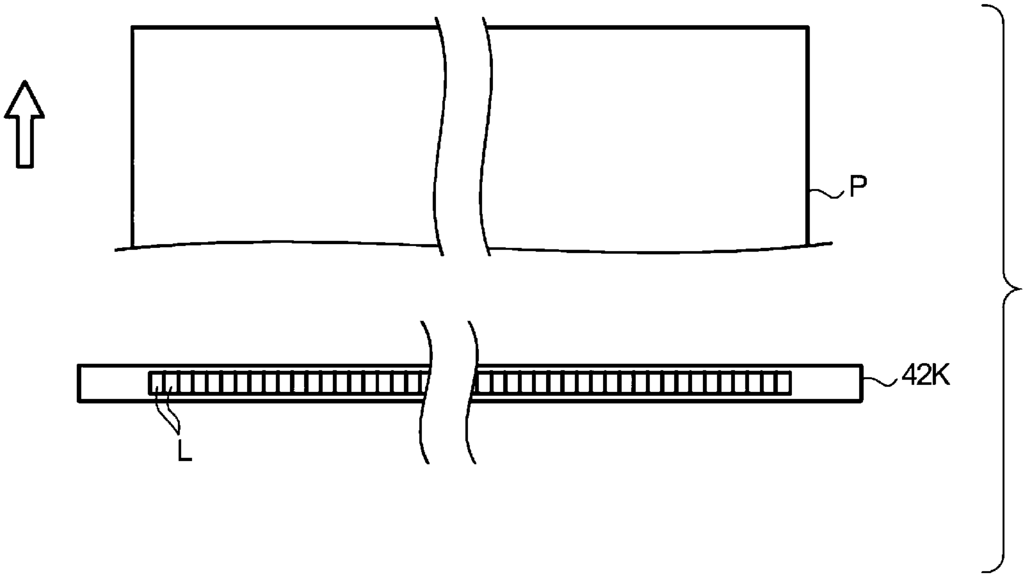
FIG. 3 is a diagram showing the relationship of an exposure device with respect to the paper in the image forming apparatus.

Next, the exposure device 42K will be described. FIG. 2 is a perspective view of the image forming unit 20, and FIG. 3 is a diagram showing the relationship of the exposure device 42K with respect to the paper P in the image forming apparatus.

The exposure device 42K includes a solid-state head. The solid-state head includes, for example, a predetermined number of light emitting elements L arranged in a straight line. One light emitting element L is configured to irradiate one point on the photoconductor drum 51K with light. The exposure device 42K is arranged so that the predetermined number of light emitting elements L extend in the main scanning direction, which is a direction parallel to the rotation axis of the photoconductor drum 51K. The main scanning direction is a direction orthogonal to the sub-scanning direction, which is the conveying direction of the paper P. In FIGS. 2 and 3, the conveying direction of the paper P is indicated by a white arrow. The predetermined number of light emitting elements L in the exposure device 42K is determined by the resolution, the size in the main scanning direction of the maximum paper that can be used by the image forming apparatus 1, and the predetermined margin width.

The exposure device 42K forms a latent image for one line on the photoconductor drum 51K by irradiating the photoconductor drum 51K with light by a plurality of light emitting elements aligned in the main scanning direction. Further, the exposure device 42K forms a latent image for a plurality of lines by continuously irradiating the rotating photoconductor drum 51K with light.

In the above configuration, if the surface of the photoconductor drum 51K charged by the charging charger 52K is irradiated with light from the exposure device 42K, an electrostatic latent image is formed. If the layer of the developer formed on the surface of the developing roller is close to the surface of the photoconductor drum 51K, the toner contained in the developer adheres to the latent image formed on the surface of the photoconductor drum 51K. As a result, a toner image is formed on the surface of the photoconductor drum 51K.

Next, the transfer mechanism 43 will be described.

The transfer mechanism 43 is a component unit that transfers the toner images formed on the surfaces of the photoconductor drums 51C, 51M, 51Y, and 51K to the paper P.

The transfer mechanism 43 includes, for example, an intermediate transfer belt 61, a secondary transfer facing roller 62, a plurality of primary transfer rollers 63C, 63M, 63Y, and 63K, and a secondary transfer roller 64.

The intermediate transfer belt 61 is an endless belt wound around the secondary transfer facing roller 62, a driven roller, and a plurality of winding rollers. In the intermediate transfer belt 61, the inner surface (inner peripheral surface) is in contact with the secondary transfer facing roller 62, the driven roller, and the plurality of winding rollers, and the outer surface (outer peripheral surface) faces the photoconductor drums 51C, 51M, 51Y, and 51K of the process units 41C, 41M, 41Y, and 41K.

The secondary transfer facing roller 62 rotates to move the intermediate transfer belt 61 in a predetermined moving direction. The driven roller and the plurality of winding rollers are configured to be freely rotatable. The driven roller and the plurality of winding rollers rotate according to the movement of the intermediate transfer belt 61 by the secondary transfer facing roller 62.

The plurality of primary transfer rollers 63C, 63M, 63Y, and 63K are component units that bring the intermediate transfer belt 61 into contact with the photoconductor drum 51K of the process unit 41K. The plurality of primary transfer rollers 63C, 63M, 63Y, and 63K are provided to correspond to the photoconductor drums 51C, 51M, 51Y, and 51K of the plurality of process units 41C, 41M, 41Y, and 41K. Specifically, the plurality of primary transfer rollers 63C, 63M, 63Y, and 63K are provided at the positions to face the photoconductor drums 51C, 51M, 51Y, and 51K of the corresponding process units 41C, 41M, 41Y, and 41K, respectively, with the intermediate transfer belt 61 interposed therebetween. The primary transfer rollers 63C, 63M, 63Y, and 63K come into contact with the inner peripheral surface side of the intermediate transfer belt 61 to displace the intermediate transfer belt 61 to the sides of the photoconductor drums 51C, 51M, 51Y, and 51K. As a result, the primary transfer rollers 63C, 63M, 63Y, and 63K bring the outer peripheral surface of the intermediate transfer belt 61 into contact with the photoconductor drums 51C, 51M, 51Y, and 51K.

The secondary transfer roller 64 is provided at a position facing the intermediate transfer belt 61. The secondary transfer roller 64 comes into contact with the outer peripheral surface of the intermediate transfer belt 61 and applies pressure. As a result, a transfer nip is formed in which the secondary transfer roller 64 and the outer peripheral surface of the intermediate transfer belt 61 are in close contact with each other. If the paper P passes through the transfer nip, the secondary transfer roller 64 presses the paper P passing through the transfer nip against the outer peripheral surface of the intermediate transfer belt 61.

The secondary transfer roller 64 and the secondary transfer facing roller 62 rotate in opposite directions to convey the paper P supplied from the paper feed conveyance path 31 in a sandwiched state. As a result, the paper P passes through the transfer nip.

In the above configuration, if the outer peripheral surface of the intermediate transfer belt 61 comes into contact with the photoconductor drums 51C, 51M, 51Y, and 51K, the toner images formed on the surface of the photoconductor drums 51C, 51M, 51Y, and 51K are transferred onto the outer peripheral surface of the intermediate transfer belt 61. If the image forming unit 20 includes a plurality of process units 41C, 41M, 41Y, and 41K, the intermediate transfer belt 61 receives the toner images from the photoconductor drums 51C, 51M, 51Y, and 51K of the plurality of process units 41C, 41M, 41Y, and 41K. The toner of the toner image transferred to the outer peripheral surface of the intermediate transfer belt 61 is conveyed by the intermediate transfer belt 61 to the transfer nip in which the secondary transfer roller 64 and the outer peripheral surface of the intermediate transfer belt 61 are in close contact with each other. If the paper P is present in the transfer nip, the toner image transferred to the outer peripheral surface of the intermediate transfer belt 61 is transferred to the paper P in the transfer nip. In order to assist this transfer, the system controller 13 applies a transfer bias having the same polarity as the toner on the outer peripheral surface of the intermediate transfer belt 61 to the secondary transfer facing roller 62, thereby generating an electric field for transferring the toner image on the outer peripheral surface of the intermediate transfer belt 61 onto the paper P, between the intermediate transfer belt 61 and the secondary transfer roller 64.

Further, after the transfer to the paper P is completed, the system controller 13 applies a cleaning bias in which the positive polarity and the negative polarity are alternately switched to the secondary transfer facing roller 62. As a result, the adhered toner on the secondary transfer roller 64 charged to be negative or positive is collected on the intermediate transfer belt 61 side. The residual toner that was not transferred to the paper P and the toner collected from the secondary transfer roller 64 on the outer peripheral surface of the intermediate transfer belt 61 are cleaned by a cleaner.

Next, the configuration related to the fixing of the image forming apparatus 1 will be described.

The fixing device 21 fixes the toner image on the paper P onto which the toner image is transferred. The fixing device 21 operates under the control of the system controller 13. The fixing device 21 includes a rotating body for fixing, a pressurizing member, and a heating member. The rotating body for fixing is, for example, a heat roller 71. The pressurizing member is, for example, a press roller 72. The heating member is, for example, a heater that heats the heat roller 71.

The heat roller 71 includes a core metal formed of hollow metal and an elastic layer formed on the outer periphery of the core metal. The inside of the core metal of the heat roller 71 is heated by a heater arranged inside the core metal formed in a hollow shape. The heat generated inside the core metal is transferred to the surface of the heat roller 71, which is the outside, that is, the surface of the elastic layer. The rotating body for fixing may be configured as an endless belt.

The press roller 72 is provided at a position facing the heat roller 71. The press roller 72 includes a core metal formed of a metal having a predetermined outer diameter, and an elastic layer formed on the outer periphery of the core metal. The press roller 72 applies pressure to the heat roller 71. If pressure is applied from the press roller 72 to the heat roller 71, a nip (fixing nip) in which the press roller 72 and the heat roller 71 are in close contact with each other is formed. The press roller 72 rotates to move the paper P that entered the fixing nip and presses the paper P against the heat roller 71. The heat roller 71 and the press roller 72 may each include a release layer on the surfaces thereof.

With the above configuration, the heat roller 71 and the press roller 72 apply heat and pressure to the paper P passing through the fixing nip. The toner on the paper P is melted by the heat given from the heat roller 71 and is applied to the surface of the paper P by the pressure given by the heat roller 71 and the press roller 72. As a result, the toner image is fixed onto the paper P that passed through the fixing nip. The paper P that passed through the fixing nip is introduced into the paper discharge conveyance path 32 and discharged to the outside of the housing 11. The paper P discharged by the paper discharge conveyance path 32 is supported by the paper discharge tray 18.

Next, the configuration of the electrical system of the image forming apparatus 1 will be described.

The display unit 15, the operation interface 16, and the main power switch 24 are arranged on the operation panel 14.

The display unit 15 includes a display. The display displays a screen according to a video signal input from the system controller 13. For example, the display displays a screen for various settings of the image forming apparatus 1.

The operation interface 16 is connected to an operation member. The operation interface 16 supplies an operation signal in response to the operation of the operation member to the system controller 13. The operation member is, for example, at least one of a touch sensor, a numeric keypad, a paper feed key, various function keys, a keyboard and the like. The touch sensor acquires information indicating a designated position within a certain region. The touch sensor is configured as a touch panel integrally with the display unit 15, so that a signal indicating the touched position on the screen displayed on the display unit 15 is input to the system controller 13.

The main power switch 24 is a switch that supplies and cuts off power for driving the image forming apparatus 1 by ON and OFF operations. The ON operation of the main power switch 24 starts the image forming apparatus 1, and the OFF operation causes the image forming apparatus 1 to stop driving.

The communication interface 12 is an interface for communicating with other devices. The communication interface 12 is used for communication with an information processing device that supplies a print job to the image forming apparatus 1. The information processing device includes, for example, a personal computer (PC), a notebook PC, a smartphone, a tablet PC, and the like. The image forming apparatus can communicate with a plurality of information processing devices. The communication interface 12 is configured as, for example, a LAN connector or the like. The communication interface 12 may perform wireless communications with other devices in accordance with communication protocol standards including Bluetooth (registered trademark), Wi-Fi (registered trademark), and the like.

The system controller 13 controls the image forming apparatus 1. The system controller 13 includes, for example, a processor 22 and a memory 23. In FIG. 1, "processor" is described as "PRO" and "memory" is described as "MEM".

The processor 22 is an arithmetic element that executes arithmetic processing. The processor 22 is, for example, a CPU. The processor 22 may include a plurality of CPUs, or the CPUs may be capable of multitasking and multithreading. The processor 22 may include an internal memory, various interfaces, and the like. The processor 22 performs various processes based on data such as a program stored in the internal memory or the memory 23. The processor 22 implements various processes by executing a program stored in the internal memory or the memory 23.

Some of the various functions implemented by the processor 22 executing a program may be implemented by various types of hardware circuits including integrated circuits such as ASIC (Application Specific Integrated Circuit), DSP (Digital Signal Processor), FPGA (field-programmable gate array), and GPU (Graphics Processing Unit). In this case, the processor 22 controls the functions executed by the hardware circuit.

Figure 4:
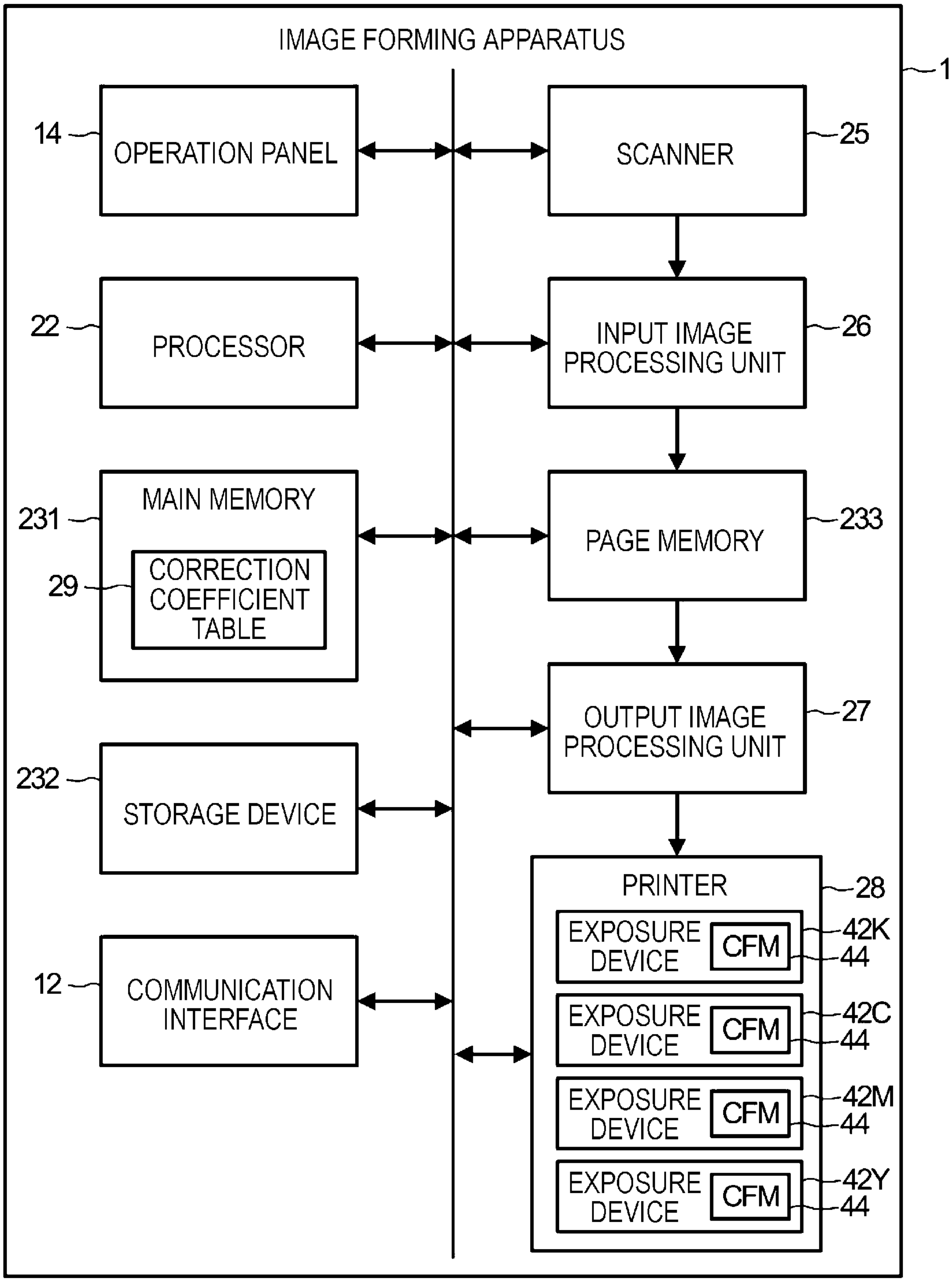
FIG. 4 is a block diagram showing an electrical configuration of the image forming apparatus.

FIG. 4 is a block diagram showing an electrical configuration of the image forming apparatus 1.

The image forming apparatus 1 includes, as the memory 23, a main memory 231, a storage device 232, a page memory 233, and the like. Further, the image forming apparatus 1 includes a scanner 25, an input image processing unit 26, an output image processing unit 27, a printer 28, and the like in addition to the communication interface 12, the operation panel 14, the processor 22, the main memory 231, the page memory 233, and the storage device 232. Each of these units is connected to each other via a data bus or the like.

The main memory 231 is a volatile memory. The main memory 231 is a working memory or a buffer memory. The main memory 231 stores various application programs based on the commands from the processor 22. Further, the main memory 231 may store data necessary for executing the application program, execution results of the application program, and the like. In the present embodiment, the main memory 231 stores a correction coefficient table 29. The correction coefficient table 29 will be described later.

The storage device 232 is a non-volatile memory capable of writing and rewriting data. The storage device 232 is configured with, for example, an HDD (Hard Disk Drive), an SSD (Solid State Drive), a flash memory, or the like. The storage device 232 stores a control program, an application, various data, and the like according to the operational use of the image forming apparatus 1.

The scanner 25 optically scans the document and reads the image of the document as image data. The scanner 25 reads the document as a color image. The scanner 25 is composed of a sensor array formed in the main scanning direction and the like. The scanner 25 moves the sensor array in the sub-scanning direction and reads the entire document.

The input image processing unit 26 processes the image data read by the scanner 25. Further, the input image processing unit 26 processes image data from other than the scanner 25. For example, the input image processing unit 26 may process image data acquired from an external device via the communication interface 12. Further, if the image forming apparatus 1 includes a reader of a storage medium such as a USB memory, the input image processing unit 26 may process the image data read from the storage medium. The input image processing unit 26 generates a print job based on the image data. The processor 22 stores the generated print job in the page memory 233.

The print job includes image data showing an image to be formed on the paper P. The image data may be data for forming an image on one sheet of paper P or may be data for forming an image on a plurality of sheets of paper P. The print job also contains information indicating whether it is a color print or a monochrome print. The print job may contain information such as the number of copies to be printed (the number of page sets) and the number of prints per copy (the number of pages).

The output image processing unit 27 processes the image data included in the print job stored in the page memory 233 so that the printer 28 can print the image data on the paper. Further, the processor 22 generates print control information for controlling the operation of the printer 28 based on the print job stored in the page memory 233. The print control information includes information indicating the timing of paper passing. The processor 22 may be able to perform processing operations as the input image processing unit 26 and the output image processing unit 27 by executing a predetermined program. In such a configuration, the input image processing unit 26 and the output image processing unit 27 can be omitted.

The printer 28 includes the conveying unit 19, the image forming unit 20, and the fixing device 21. The printer 28 prints the image data processed by the output image processing unit 27 on the paper P by the conveying unit 19, the image forming unit 20, and the fixing device 21 based on the print control information of the processor 22.

The exposure devices 42C, 42M, 42Y, and 42K mounted on the image forming unit 20 each includes a correction coefficient memory 44. The correction coefficient memory 44 stores first and second correction coefficients for each of the plurality of light emitting elements L included in the exposure device 42C, 42M, 42Y or 42K. FIG. 5 is a diagram showing an example of the first and second correction coefficients stored in the correction coefficient memory 44. The correction coefficient memory 44 assigns light emitting point numbers from "1" with respect to the light emitting elements L, and stores the first and second correction coefficients for each light emitting point number. The first correction coefficient is, for example, a constant light amount correction value, and the second correction coefficient is, for example, a spot diameter correction value.

The processor 22 reads the first and second correction coefficients from the correction coefficient memory 44 of each of the exposure devices 42C, 42M, 42Y, and 42K, and stores the read correction coefficients in the correction coefficient table 29 of the main memory 231. FIG. 6 is a diagram showing an example of the correction coefficient table 29. The processor 22 stores the first and second correction coefficients in the correction coefficient table 29 in association with the unit names of the exposure devices 42C, 42M, 42Y, and 42K. Further, the processor 22 calculates a third correction coefficient between the first and second correction coefficients based on the first and second correction coefficients and calculates a fourth correction coefficient by changing the calculated third correction coefficient based on Duty, which is the light emission time set according to the gradation of the image to be formed. Then, the processor 22 stores the calculated correction coefficient in the correction coefficient table 29. The fourth correction coefficient includes three types of correction coefficients depending on the value of Duty. Details of the third and fourth correction coefficients will be described later.

Figure 7:
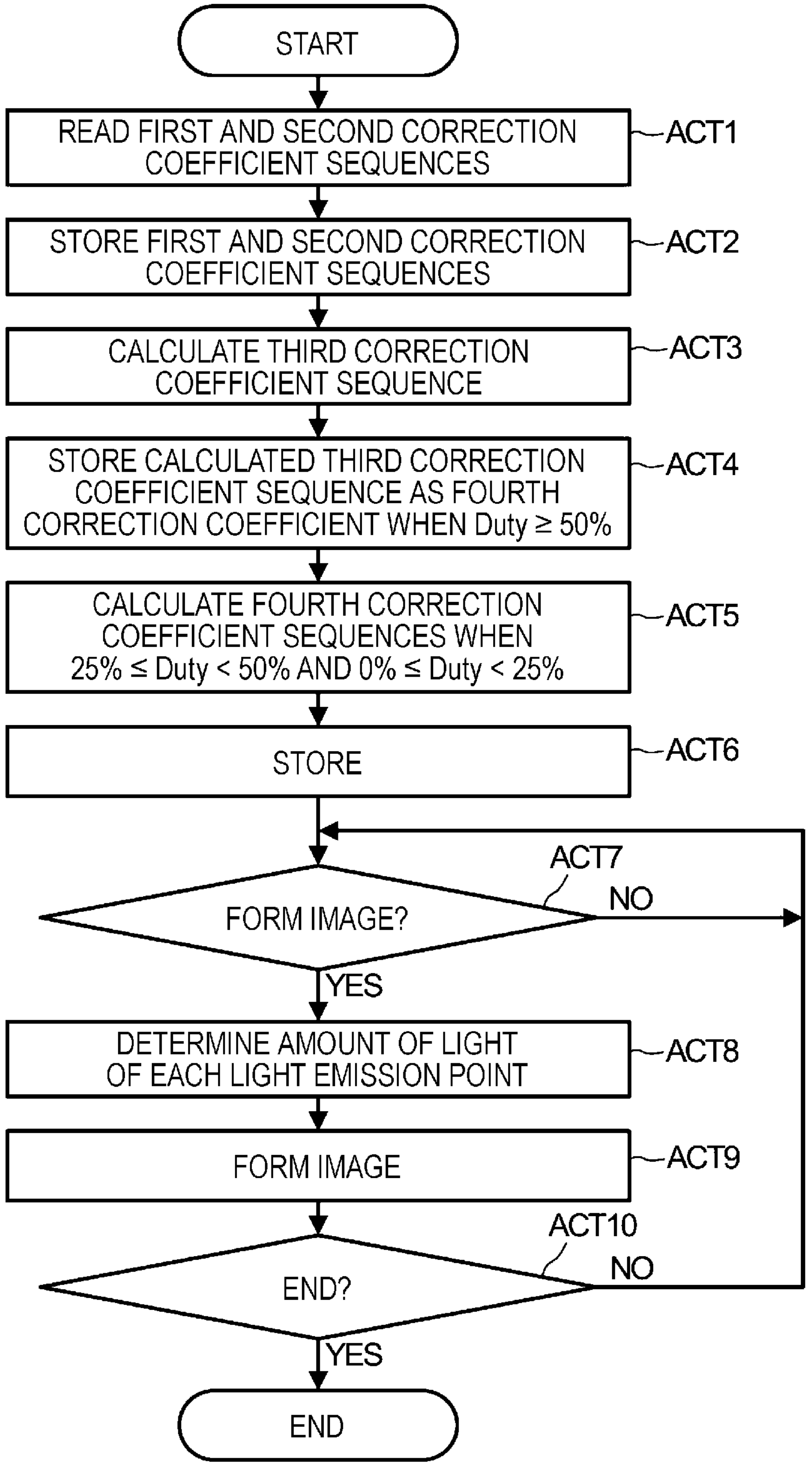
FIG. 7 is a flowchart for illustrating an example of the operation of the image forming apparatus.

Next, the operation of the image forming apparatus 1 having the above configuration will be described. FIG. 7 is a flowchart for illustrating an example of the operation of the image forming apparatus 1. If the main power switch 24 of the operation panel 14 is turned on, the processor 22 of the system controller 13 of the image forming apparatus 1 starts the operation shown in the flowchart by executing the system program stored in the memory 23. Here, for the sake of simplification, the description of operations other than the operations related to image formation will be omitted.

First, the processor 22 reads out the first and second correction coefficient sequences from the correction coefficient memory 44 of each of the plurality of mounted exposure devices 42C, 42M, 42Y, and 42K (ACT 1). That is, the processor 22 reads a set of first correction coefficients and a set of second correction coefficients for the plurality of light emitting elements L mounted on the exposure device 42C, 42M, 42Y, or 42K from each correction coefficient memory 44.

Then, the processor 22 stores the first and second correction coefficient sequences read out in the correction coefficient table 29 configured in the main memory 231 (ACT 2). That is, the processor 22 stores the first and second correction coefficient sequences for the plurality of light emitting elements L of each exposure device 42C, 42M, 42Y, or 42K in the correction coefficient table 29 in association with the corresponding unit names of the light emitting points.

Here, the first and second corrections by the first and second correction coefficients will be described.

Figures 8, 9:
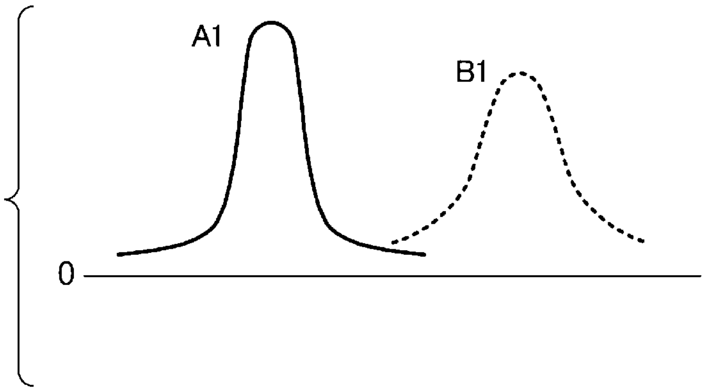
FIG. 8 is a table showing outputs after the first and second corrections according to the example of the first and second correction coefficients of FIG. 5.
FIG. 9 is a diagram showing an example of a first corrected beam profile of the light beams emitted from two light emitting points.

FIG. 8 is a table showing the outputs after the first and second corrections according to the example of the first and second correction coefficients of FIG. 5. The first column of FIG. 8 shows an example of the light amount at each light emitting point without correction if the standard light amount is "100". The second and fourth columns are the first and second correction coefficient sequences. For example, when trying to make each light emitting point emit light with a standard light amount "100", the processor 22 applies the first correction coefficient sequence to each light emitting point to correct the light output of each light emitting point. That is, the first correction is performed. By doing so, the light amount at each light emitting point can be made uniform to "100" as shown in the third column of FIG. 8 showing the output after the first correction.

FIG. 9 is a diagram showing an example of the first corrected beam profile of the light beam emitted from the two light emitting points A and B. As shown in FIG. 9, in the beam profile A1 of the light beam from the light emitting point A and the beam profile B1 of the light beam from the light emitting point B, the light amount is constant by the first correction. However, since the beam profiles are different from each other, the development density is different, especially in the halftone image. This difference in development density causes streak unevenness in the formed image.

Therefore, as the second correction, the spot diameter correction is performed so that the spot diameter of the light beam irradiated on the photoconductor drums 51C, 51M, 51Y, and 51K is the same for the light emitting point. The correction coefficient sequence applied for the second correction is the second correction coefficient sequence. The fifth column of FIG. 8 shows the output after the second correction. The spot diameter correction adjusts the actual light amount so that the beam diameters at a fixed ratio position (beam height threshold value) of the average height of each light beam are aligned, for example. That is, the value of the second correction coefficient changes depending on the height of the threshold value.

Figure 10:
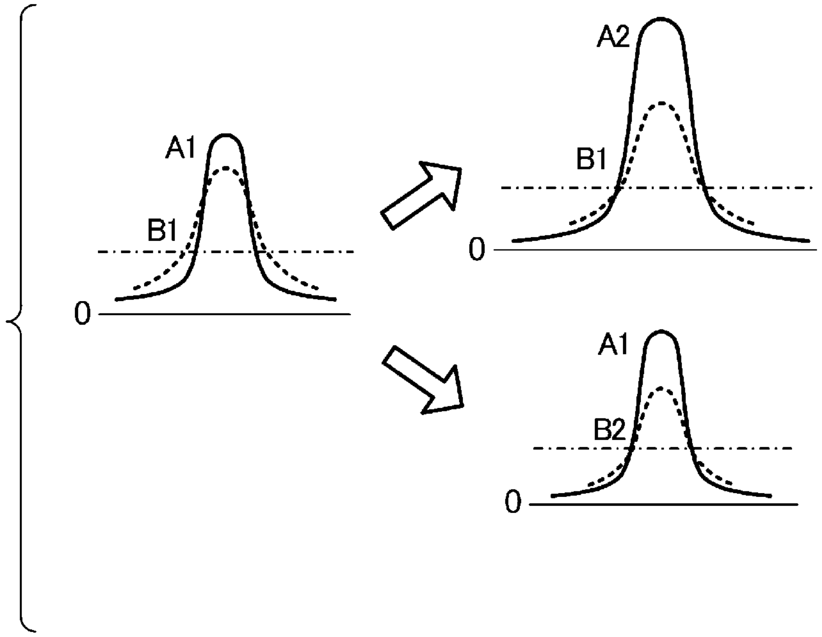
FIG. 10 is a conceptual diagram showing a second correction.

FIG. 10 is a conceptual diagram showing the second correction. In FIG. 10, the alternate long and short dash line indicates the height threshold value of the beam. Further, the drawing on the left side in FIG. 10 shows the beam profile A1 after the first correction of the light emitting point A and the beam profile B1 after the first correction of the light emitting point B in a superimposed manner, and the two drawings on the right side show the second corrected output with the second correction. Here, the drawing on the upper right side shows a case where the second correction is performed for the light emitting point A so as to be aligned with the beam diameter at the height threshold value of the light beam from the light emitting point B. That is, the beam profile of the light beam from the light emitting point A is changed from the beam profile A1 after the first correction to the beam profile A2 after the second correction. Further, the drawing on the lower right side shows a case where the second correction is performed for the light emitting point B so as to be aligned with the beam diameter at the height threshold value of the light beam from the light emitting point A. That is, the beam profile of the light beam from the light emitting point B is changed from the beam profile B1 after the first correction to the beam profile B2 after the second correction.

Figure 11:
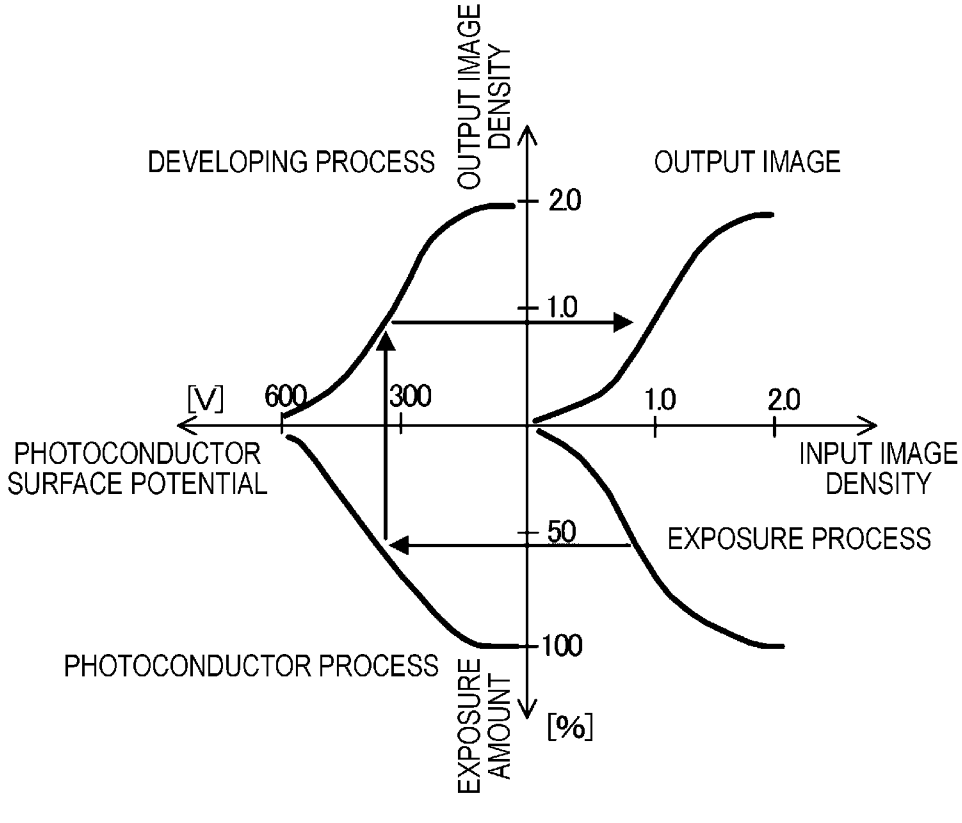
FIG. 11 is a diagram showing the characteristics of image density in image formation by electrophotography.

FIG. 11 is a diagram showing the characteristics of image density in image formation by electrophotography. The characteristics of image density in the image formation by electrophotography are generally represented as shown in FIG. 11. The photoconductor potential is attenuated and saturated with a large light amount. Also, regarding the development characteristics, the image density is not proportional to the amount of developing toner. The image density is saturated if the amount of developing toner is large, the sensitivity is low in the region where the amount of developing toner is small, and the slope is large in the intermediate region, which makes an S-shaped curve.

At the time of image formation in the image forming apparatus 1, especially in a halftone image, the intermediate potential region in the latent image distribution of the photoconductor increases due to the influences of the exposure by the synthesis of the Gaussian beam, and the charge diffusion phenomenon of the charge transport layer in the case of the photoconductor having a laminated structure. Further, it can be considered that the development characteristics have a certain range even when viewed in units of each light emitting point of the exposure devices 42C, 42M, 42Y, and 42K. In particular, in the two-component development using the toner and the carrier, the gap between the photoconductor and the developing electrode is larger than that in the one-component development, and the characteristics are as if they were integrated. In terms of the beam height threshold value, the amount of toner to be developed is determined by the area included in the region having a certain width. That is, it is not a threshold value but a threshold value range, and the spot diameter correction is preferably performed in this way. Moreover, this threshold value range varies depending on the settings of the developing process and various factors.

In the related art, it has been considered to calculate with the first correction coefficient and the second correction coefficient and set the third correction coefficient between the first and second correction coefficients. For example, if the first correction coefficient is C1, the second correction coefficient is C2, and r is a constant, the third correction coefficient C3 can be calculated by:

$$C3=rC2\times(1-r)C1$$

However, in the related art, there is no concept of a threshold value range. That is, in the related art, the beam height threshold value is optimized by changing the beam height threshold value according to the situation of each light emitting point.

In the present embodiment, the concept of the threshold value range is introduced, and further, the correction coefficient is calculated according to the light emission time (Duty) of the light emitting point at the time of image formation and reflected in the light emission time.

Figures 12, 13:
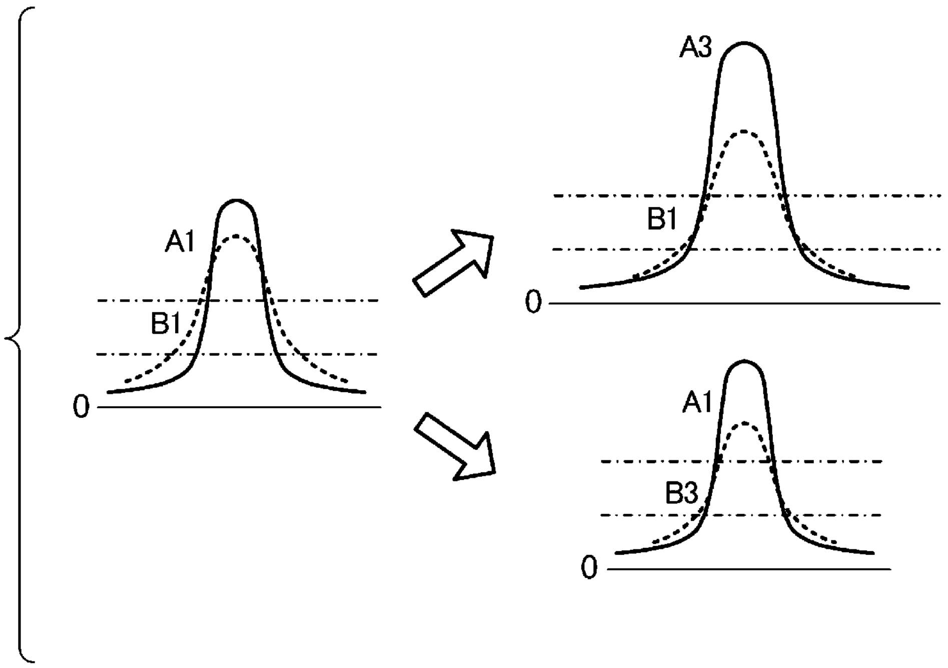
FIG. 12 is a conceptual diagram showing a third correction if the concept of a threshold value range is introduced.
FIG. 13 is a table showing a third correction coefficient according to the example of the first and second correction coefficients of FIG. 5.

FIG. 12 is a conceptual diagram showing a third correction if the concept of the threshold value range is introduced, and FIG. 13 is a table showing the third correction coefficient according to the example of the first and second correction coefficients in FIG. 5. In FIG. 13, the first to fifth columns are the same as in FIG. 8, and the sixth column shows an example of a third correction coefficient sequence to which the third correction is applied.

In FIG. 12, the development threshold value range is between the two alternate long and short dash lines. The drawing on the left side in FIG. 12 shows, in a superimposed manner, the beam profiles A1 and B1 after the first correction, for example, if the first correction for adjusting the light amounts of the two light emitting points A and B was performed in a region close to the full Duty. The two drawings on the right side each show the third corrected output after the third correction was performed. If the light amounts are adjusted if the profiles of the light emitting points A and B are different (an image of matching the entire area), the beam profiles A1 and B1 in the drawing on the left side are obtained. However, since the image is actually formed through development, the light amount of the beam profile A1, that is, the light emission time (Duty) is increased as shown in the upper right drawing in order to eliminate the streak unevenness, and the third correction is performed to adjust the area of the development threshold value range between alternate long and short dash lines. That is, the beam profile of the light beam from the light emitting point A is changed from the beam profile A1 after the first correction to the beam profile A3 after the third correction by the third correction. Further, the lower right drawing shows a case where the light amount (light emission time) of the beam profile B1 is reduced, and the area of the development threshold value range between the alternate long and short dash lines is adjusted in the same way as the upper right drawing. That is, the beam profile of the light beam from the light emitting point B is changed from the beam profile B1 after the first correction to the beam profile B3 after the third correction by the third correction.

Figure 14:
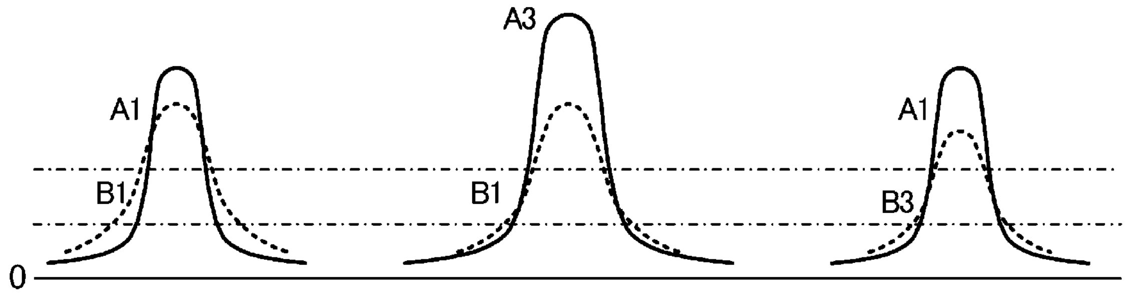
FIG. 14 is a conceptual diagram showing a third correction at the time of full light emission.
Figure 15:
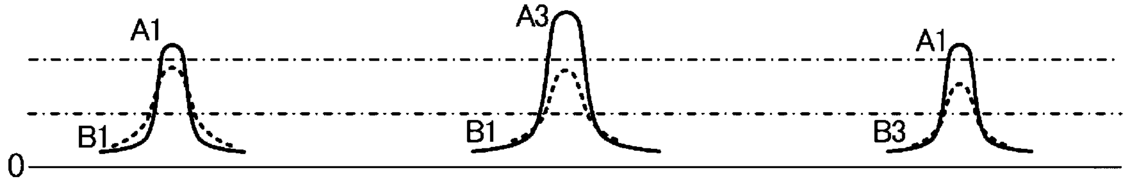
FIG. 15 is a conceptual diagram showing a third correction at the time of short Duty.
Figure 16:
FIG. 16 is a conceptual diagram showing a third correction at the time of shorter Duty than that of FIG. 15.

FIG. 14 is a conceptual diagram showing a third correction at the time of full light emission, FIG. 15 is a conceptual diagram showing a third correction at the time of short Duty, and FIG. 16 is a conceptual diagram showing a third correction at the time of shorter Duty than that of FIG. 15. In FIGS. 14 to 16, the beam profiles A1 and B1 after the first correction, the beam profiles A3 and B1 after the third correction obtained by performing the third correction for the light emitting point A, and the beam profiles A1 and B3 after the third correction obtained by performing the third correction for the light emitting point B are shown side by side.

As shown in FIG. 14, the light amount of the beam profile A1, that is, the light emission time (Duty) is increased as in the beam profile A3, or the light amount of the beam profile B1 is decreased as in the beam profile B3. By performing the third correction to adjust the area of the development threshold value range between the alternate long and short dash lines, it is possible to eliminate the streak unevenness.

However, if the Duty at the time of image formation becomes short, as shown in FIG. 15, the area between the alternate long and short dash lines differs between the beam profile A3 and the beam profile B1, and if the beam profile A3 remains as it is, the amount of development at the light emitting point of the beam profile A3 will increase. Further, the area between the alternate long and short dash lines differs between the beam profile A1 and the beam profile B3, and if the beam profile B3 remains as it is, the amount of development at the light emitting point of the beam profile B3 becomes small.

If the Duty is further shortened, the tendency becomes stronger as shown in FIG. 16.

Therefore, if the Duty at the time of image formation is shorter than the reference Duty, for example, 50%, the following can be performed. That is, for the light emitting point A in which the light amount is set larger than the light amount after the first correction as the light amount after the third correction, the intensity of the third correction is lowered to be re-corrected to a value closer to the first correction (value close to the beam profile A1). Further, for the light emitting point B in which the light amount is set smaller than the light amount after the first correction as the light amount after the third correction, the intensity of the third correction is increased to be re-corrected to a value closer to the first correction (value close to the beam profile B1). Furthermore, it is effective to change the intensity of the re-correction according to the shortness of the Duty.

The image forming apparatus 1 of the present embodiment calculates the correction coefficient for performing such a correction as the fourth correction coefficient for each light emitting point, and at the time of image formation, the light amount of each light emitting point is corrected by the fourth correction coefficient.

Therefore, the processor 22 calculates a third correction coefficient sequence (ACT 3). That is, the processor 22 calculates the third correction coefficient sequence for each of the plurality of light emitting points (light emitting elements L) of the exposure devices 42C, 42M, 42Y, and 42K based on the first and second correction coefficient sequences for the plurality of light emitting points stored in the correction coefficient table 29 of the main memory 231 in ACT 2. Specifically, the processor 22 calculates each third correction coefficient, for example, in a simple calculation formula:

$$\text{Third correction coefficient} = \text{Second correction coefficient} - K^{*}(\text{Second correction coefficient} - \text{First correction coefficient}).$$

Here, K is a constant.

The electrophotographic device has a process control mechanism called image quality maintenance control in order to keep the image density constant and controls the charging potential, development potential, development contrast potential, and the like in accordance with changes in the surrounding environment, changes in the photoconductor or developer over time, and the like. By this image quality maintenance control, the development threshold value range fluctuates in a complicated manner, and the value of K is determined based on the fluctuation. According to the above equation, the K value determined based on the development contrast potential in the image quality maintenance control, and the ambient temperature and humidity sensor value is used uniformly at all light emitting points.

However, when viewed at each light emitting point, if the focal position or the like deviates from the appropriate value, the second correction may actually increase the streaks. Since the beam profile changes if the focus shifts, the spot diameter correction, which is the second correction, becomes more harmful as the focal length shifts, and tends to be better if it is closer to the first correction than if it is apparently calculated. Therefore, if the device can identify a portion having a large defocus, it is also effective to partially change the value of K.

Then, the processor 22 stores the third correction coefficient sequence calculated in this way as the fourth correction coefficient sequence in the correction coefficient table 29 of the main memory 231 if the Duty at the time of image formation is longer than the reference Duty, for example, when the Duty≥50% (ACT 4).

Further, the processor 22 calculates a fourth correction coefficient sequence when 25%≤Duty<50% and a fourth correction coefficient sequence when 0%≤Duty<25% (ACT 5). That is, the processor 22 calculates a fourth correction coefficient sequence if the Duty at the time of image formation is between the reference Duty and a specified Duty, for example, 25%, and a fourth correction coefficient sequence if the Duty at the time of image formation is shorter than the specified Duty. Specifically, if the first correction coefficient is C1, the third correction coefficient is C3, and the fourth correction coefficient is C4, the processor 22 calculates each fourth correction coefficient C4 when 25%≤Duty<50%, for example, by:

$$C4=C3-(C3-C1)*½$$

Further, the processor 22 calculates each fourth correction coefficient C4 when 0%≤Duty<25%, for example, by:

$$C4=C3-(C3-C1)*¾$$

Then, the processor 22 stores the fourth correction coefficient sequences when 25%≤Duty<50% and 0%≤Duty<25% calculated in this way in the correction coefficient table 29 of the main memory 231 (ACT 6).

As described above, as shown in FIG. 6, in the correction coefficient table 29 of the main memory 231, the fourth correction coefficient sequence when Duty≥50%, the fourth correction coefficient sequence when 25%≤Duty<50%, and the fourth correction coefficient sequence when 0%≤Duty<25% are stored for each of the exposure devices 42C, 42M, 42Y, and 42K.

After that, the processor 22 determines whether or not to form an image (ACT 7). For example, if the image data read by the scanner 25 or the image data acquired from an external device via the communication interface 12 was instructed to be printed, the processor 22 can determine to form an image. If it is determined not to form an image (NO in ACT 7), the processor 22 repeats the process of ACT 7 again.

On the other hand, if it is determined to form an image (YES in ACT 7), the processor 22 determines the light amount at each light emitting point of each of the exposure devices 42C, 42M, 42Y, and 42K (ACT 8). That is, the processor 22 determines the light amount at each light emitting point based on the fourth correction coefficient stored in the correction coefficient table 29 of the main memory 231 corresponding to the Duty, which is the light emission time of each light emitting point determined according to the gradation of the image to be formed.

Then, the processor 22 causes each light emitting point of each exposure device 42C, 42M, 42Y, or 42K to emit light with a light output so that the determined light amount is obtained, and the printer 28 forms an image on the paper P (ACT 9). As a result, white streaks in the low gradation portion and color streaks in the high gradation portion of the halftone image are eliminated, and good image formation results without streak-like density unevenness can be obtained in a wide range of gradations.

After that, the processor 22 determines whether or not to end (ACT 10). For example, if the main power switch 24 of the operation panel 14 is turned off, it can be determined to end. If it is determined not to end (NO in ACT 10), the processor 22 repeats from the process of ACT 7.

If it is determined to end (YES in ACT 10), the processor 22 ends the operation shown in this flowchart.

In the above embodiment, the fourth correction in the case of performing the third correction for adjusting the light amount in the full Duty was described, but even in the case of correction where the third correction adjusts the light amount in another Duty such as 50% Duty, the fourth correction is, of course, effective.

Figure 17:
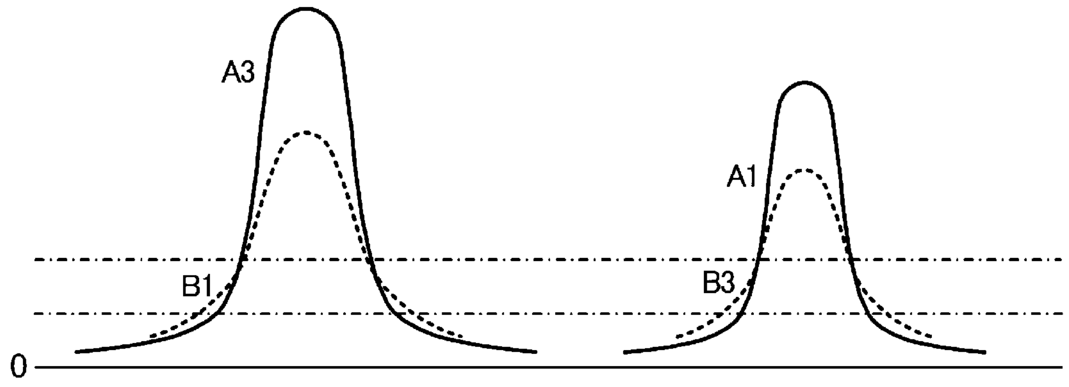
FIG. 17 is a conceptual diagram showing a third correction at the time of long Duty.

For example, FIG. 14 is set at the reference Duty time, not at the time of full light emission. In this case, if the Duty at the time of image formation becomes longer than this reference Duty, it becomes as shown in FIG. 17. FIG. 17 is a conceptual diagram showing a third correction at the time of long Duty. If the Duty at the time of image formation becomes long, as shown in FIG. 17, the area between the alternate long and short dash lines differs between the beam profile A3 and the beam profile B1, and if the beam profile A3 remains as it is, the amount of development at the light emitting point of the beam profile A3 is reduced. Further, the area between the alternate long and short dash lines differs between the beam profile A1 and the beam profile B3, and if the beam profile B3 remains as it is, the amount of development at the light emitting point of the beam profile B3 becomes larger.

Therefore, if the Duty at the time of image formation is longer than the reference Duty, the following can be performed. That is, for the light emitting point A in which the light amount is set to be larger than the light amount after the first correction as the light amount after the third correction, a fourth correction coefficient for re-correction to further increase the intensity of the third correction is set. Further, for the light emitting point B in which the light amount is set to be smaller than the light amount after the first correction as the light amount after the third correction, a fourth correction coefficient for re-correction to further reduce the intensity of the third correction is set.

Any of the four patterns described above is effective when executed, and by implementing multiple patterns, even better effects can be expected. By correcting the light amount at each light emitting point, that is, the light emission time (Duty) in this way, it is possible to prevent white spots in the low gradation portion and prevent color streaks in the high gradation portion.

Further, in the embodiment, the light amount is corrected by the fourth correction coefficient according to the Duty for each light emitting point. On the other hand, in the image formation of an electrophotography, a pixel is created by aggregating a plurality of light emitting points, and a halftone image is generated by a halftone dot configuration or a universal line configuration. In many cases, relatively, the lower the gradation of a halftone image, the smaller the light amount (Duty) at each light emitting point, but this may not always be the case. Therefore, which gradation of the halftone image is to be printed at each light emitting point may be detected from the image data, and the light amount correction may be performed by the corresponding fourth correction coefficient. That is, the light amount correction by the fourth correction coefficient may be performed not only according to the mere Duty but also according to the composition of the image.

In the embodiment, as the second correction, the spot diameter correction for correcting the light spot diameter on the photoconductor by a plurality of light emitting points to be uniform was described as an example. However, the second correction may be other corrections such as MTF correction for correcting the MTF value on the photoconductor by a plurality of light emitting points to be uniform.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An image forming apparatus equipped with an exposure device including a plurality of light emitting points, comprising:

a photoconductor on which a latent image of an image to be formed is formed on the surface thereof by light emitted from the plurality of light emitting points of the exposure device; and a processor configured to control the light emission of each of the plurality of light emitting points of the exposure device based on the image to be formed, wherein the processor calculates a fourth correction coefficient by changing a third correction coefficient, which is calculated based on a first correction coefficient for correcting a first physical quantity related to an exposure condition of the photoconductor by the light emitting points, and a second correction coefficient for correcting a second physical quantity related to the exposure condition of the photoconductor by the light emitting points and is between the first correction coefficient and the second correction coefficient, based on a light emission time set according to a gradation of the image to be formed, and corrects a light output of each of the plurality of light emitting points by the fourth correction coefficient.

2. The image forming apparatus according to claim 1, wherein if the light emission time is shorter than a reference value, the processor at least one of calculates the fourth correction coefficient so that the light output corrected by the fourth correction coefficient becomes smaller than the light output when corrected by the third correction coefficient for a light emitting point where the light output when corrected by the third correction coefficient is larger than the light output when corrected by the first correction coefficient, and calculates the fourth correction coefficient so that the light output corrected by the fourth correction coefficient becomes larger than the light output when corrected by the third correction coefficient for a light emitting point where the light output when corrected by the third correction coefficient is smaller than the light output when corrected by the first correction coefficient.

3. The image forming apparatus according to claim 2, wherein if the first correction coefficient is C1, the third correction coefficient is C3, and the fourth correction coefficient is C4, the processor calculates the fourth correction coefficient by:

$$C4=C3-(C3-C1)*\tfrac{1}{2}.$$

4. The image forming apparatus according to claim 3, wherein if the light emission time is shorter than a specified value with respect to the reference value, the processor calculates the fourth correction coefficient by:

$$C4=C3-(C3-C1)*\tfrac{3}{4}.$$

5. The image forming apparatus according to claim 1, wherein if the light emission time is longer than a reference value, the processor at least one of calculates the fourth correction coefficient so that the light output corrected by the fourth correction coefficient becomes larger than the light output when corrected by the third correction coefficient for a light emitting point where the light output when corrected by the third correction coefficient is larger than the light output when corrected by the first correction coefficient, and calculates the fourth correction coefficient so that the light output corrected by the fourth correction coefficient becomes smaller than the light output when corrected by the third correction coefficient for a light emitting point where the light output when corrected by the third correction coefficient is smaller than the light output when corrected by the first correction coefficient.

6. The image forming apparatus according to claim 1, wherein the processor uses the third correction coefficient as the fourth correction coefficient if the light emission time is longer than a reference value.

7. The image forming apparatus according to claim 1, further comprising:

a memory configured to store at least the fourth correction coefficient, wherein the processor calculates the third correction coefficient based on the first and second correction coefficients read from the exposure device, calculates the fourth correction coefficient based on the first correction coefficient and the calculated third correction coefficient, stores the calculated fourth correction coefficient in the memory, and at the time of image formation, reads the fourth correction coefficient stored in the memory to correct the light output of each of the plurality of light emitting points of the exposure device.

8. The image forming apparatus according to claim 7, wherein the processor calculates the fourth correction coefficient and stores the calculated fourth correction coefficient in the memory if the image forming apparatus is started.

9. The image forming apparatus according to claim 7, wherein the third correction coefficient is a correction coefficient for correcting the light output within a specified intensity range of the light emitted from the light emitting point to be uniform.

10. The image forming apparatus according to claim 1, wherein the first correction coefficient is a correction coefficient for correcting the light outputs of the plurality of light emitting points to be uniform, and the second correction coefficient is a correction coefficient for correcting at least one of a light spot diameter on the photoconductor by the plurality of light emitting points and an MTF value to be uniform.

11. A method for an image forming apparatus equipped with an exposure device including a plurality of light emitting points, comprising:

forming on a surface of a photoconductor a latent image of an image by light emitted from the plurality of light emitting points of the exposure device;

controlling the light emission of each of the plurality of light emitting points of the exposure device based on the image;

calculating a fourth correction coefficient by changing a third correction coefficient, which is calculated based on a first correction coefficient for correcting a first physical quantity related to an exposure condition of the photoconductor by the light emitting points, and a second correction coefficient for correcting a second physical quantity related to the exposure condition of the photoconductor by the light emitting points and is between the first correction coefficient and the second correction coefficient, based on a light emission time set according to a gradation of the image; and correcting a light output of each of the plurality of light emitting points by the fourth correction coefficient.

12. The method according to claim 11, further comprising:

if the light emission time is shorter than a reference value, at least one of calculating the fourth correction coefficient so that the light output corrected by the fourth correction coefficient becomes smaller than the light output when corrected by the third correction coefficient for a light emitting point where the light output when corrected by the third correction coefficient is larger than the light output when corrected by the first correction coefficient; and calculating the fourth correction coefficient so that the light output corrected by the fourth correction coefficient becomes larger than the light output when corrected by the third correction coefficient for a light emitting point where the light output when corrected by the third correction coefficient is smaller than the light output when corrected by the first correction coefficient.

13. The method according to claim 12, further comprising:

if the first correction coefficient is C1, the third correction coefficient is C3, and the fourth correction coefficient is C4, calculating the fourth correction coefficient by:

$$C4=C3-(C3-C1)*\frac{1}{2}.$$

14. The method according to claim 13, further comprising:

if the light emission time is shorter than a specified value with respect to the reference value, calculating the fourth correction coefficient by:

$$C4=C3-(C3-C1)*\frac{3}{4}.$$

15. The method according to claim 11, further comprising:

if the light emission time is longer than a reference value, at least one of calculating the fourth correction coefficient so that the light output corrected by the fourth correction coefficient becomes larger than the light output when corrected by the third correction coefficient for a light emitting point where the light output when corrected by the third correction coefficient is larger than the light output when corrected by the first correction coefficient, and calculating the fourth correction coefficient so that the light output corrected by the fourth correction coefficient becomes smaller than the light output when corrected by the third correction coefficient for a light emitting point where the light output when corrected by the third correction coefficient is smaller than the light output when corrected by the first correction coefficient.

16. The method according to claim 11, further comprising:

using the third correction coefficient as the fourth correction coefficient if the light emission time is longer than a reference value.

17. The method according to claim 11, further comprising:

storing at least the fourth correction coefficient a memory;

calculating the third correction coefficient based on the first and second correction coefficients read from the exposure device;

calculating the fourth correction coefficient based on the first correction coefficient and the calculated third correction coefficient;

storing the calculated fourth correction coefficient in the memory; and at the time of image formation, reading the fourth correction coefficient stored in the memory to correct the light output of each of the plurality of light emitting points of the exposure device.

18. The method according to claim 17, further comprising:

calculating the fourth correction coefficient and storing the calculated fourth correction coefficient in the memory if the image forming apparatus is started.

19. The method according to claim 17, wherein the third correction coefficient is a correction coefficient for correcting the light output within a specified intensity range of the light emitted from the light emitting point to be uniform.

20. The method according to claim 11, wherein the first correction coefficient is a correction coefficient for correcting the light outputs of the plurality of light emitting points to be uniform, and the second correction coefficient is a correction coefficient for correcting at least one of a light spot diameter on the photoconductor by the plurality of light emitting points and an MTF value to be uniform.

* * * * *